United States Patent [19]

Folweiler

[11] E Patent Number: Re. 32,777

[45] Reissued Date of Patent: Nov. 1, 1988

[54] CHEMICAL VAPOR PURIFICATION OF FLUORIDES

[75] Inventor: Robert C. Folweiler, Bedford, Mass.

[73] Assignee: GTE Laboratories Incorporated, Waltham, Mass.

[21] Appl. No.: 41,960

[22] Filed: Apr. 27, 1987

Related U.S. Patent Documents

Reissue of:

[64] Patent No.: 4,652,438
Issued: Mar. 24, 1987
Appl. No.: 799,031
Filed: Nov. 18, 1985

[51] Int. Cl.[4] ..... C01B 9/08
[52] U.S. Cl. ..... 423/489
[58] Field of Search ..... 423/210 M, 210 R, 489

[56] References Cited

U.S. PATENT DOCUMENTS

| | | | |
|---|---|---|---|
| 3,995,011 | 11/1976 | Jache et al. | 423/489 |
| 4,341,873 | 7/1982 | Robinson et al. | 501/904 |
| 4,578,252 | 3/1986 | Pastor et al. | 423/489 |

*Primary Examiner*—Robert L. Stoll
*Attorney, Agent, or Firm*—Martha A. Finnegan; Frances P. Craig

[57] ABSTRACT

A chemical vapor purification process for the preparation of high purity metal fluorides using the thermodynamic separation of cations by formation of a gaseous-metal-containing compound, vapor transport, and fluorination is disclosed.

7 Claims, 1 Drawing Sheet

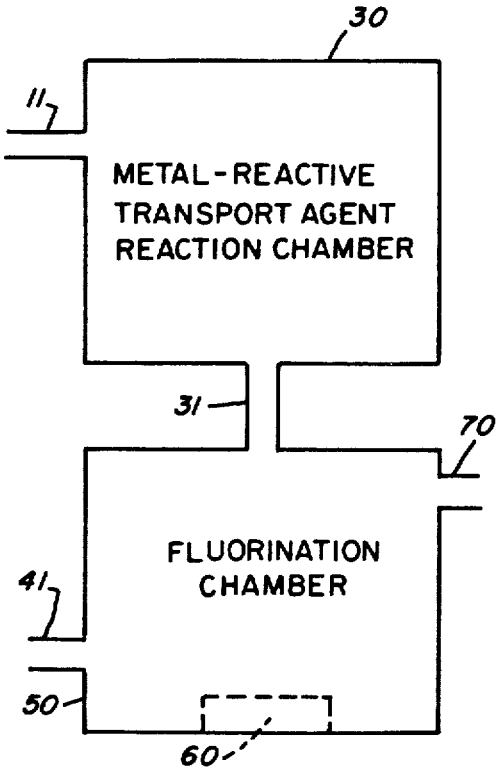
30
11
METAL-REACTIVE
TRANSPORT AGENT
REACTION CHAMBER
31
70
FLUORINATION
CHAMBER
41
50
60

CHEMICAL VAPOR PURIFICATION OF FLUORIDES

Matter enclosed in heavy brackets [ ] appears in the original patent but forms no part of this reissue specification; matter printed in italics indicates the additions made by reissue.

FIELD OF THE INVENTION

This invention relates to processes for preparing metal halides. More particularly, this invention relates to preparing high purity metal fluorides.

BACKGROUND OF THE INVENTION

Work on the purification of fluorides has intensified greatly because of interest in such applications as heavy metal fluoride glass optical fibers, tunable solid state lasers, and dielectric layers for complex semiconductor structures. Initially rapid advances were made in increasing the purity of these materials, but recent progress has slowed although impurity levels remain orders of magnitude higher than can be tolerated in some applications.

For instance heavy metal fluoride glasses show potential for fabrication of extraordinarily low loss optical fibers operating in the 2–4 μm region of the infrared. One of the most serious problems is contamination with certain divalent transition metals, some rare earth ions, and the hydroxyl ion. These impurities have strong absorptions in the optimum optical region. It is necessary to attain impurity levels of one part per billion for some of these contaminants to exploit the potential for these glasses.

A number of purification approaches are used at present, including wet chemical processing and vapor treatment. Wet processing is well known, and has limitations in the degree of purification because of recontamination from the background levels of contaminants present in the processing chemicals. Current vapor preparation techniques are limited to dealing with the existing fluoride compound, and suffer from low or non-existent thermodynamic driving force for removal of the contamination. The "reactive atmosphere process" (RAP) has been used to purify a number of starting materials, and has an important effect on the hydroxyl content, but rather little effect on the other contaminants. Physical vapor transport (sublimation) has been used to purify $ZrF_4$ and $AlF_3$ $BaF_2$ and $GdF_3$ have been purified by subliming the transition metals out of them, showing greater than an order of magnitude improvement in $Fe^{2+}$, but little effect on the other contaminant ions. Sublimation is limited by the ratio of the vapor pressure of the contaminant species to the desired compound.

One of the basic limitations of such processing is that the starting materials are often of limited purity, and the process is required to provide more purification than reasonable. In addition, there are some fundamental limitations on the amount of contaminant than can be practically removed because of similar vapor pressure of the contaminant compound over its solid solution with the major compound.

SUMMARY OF THE INVENTION

In accordance with the present invention there is provided an improved method for preparing high purity metal fluorides. The improved method of the present invention is a chemical vapor purification process comprising: reacting a metal with a reactive transport agent in the presence of a stoichiometric excess of metal to generate a gaseous metal-containing compound; isolating the gaseous metal containing compound from the starting materials; and reacting the gaseous metal-containing compound with a fluorinating agent to form a solid metal fluoride.

BRIEF DESCRIPTION OF THE DRAWING

In the drawing:

The FIGURE is a schematic diagram of a reactor suitable for use in the present invention.

For a better understanding of the present invention, together with other and further objects, advantages, and capabilities thereof, reference is made to the following disclosure and appended claims in connection with the above-described drawings.

DETAILED DESCRIPTION OF THE INVENTION

The chemical vapor purification process of the present invention overcomes the normal limitations of treatment existing compounds with an active atmosphere or agent, and replaces known processes with a new process that completely avoids the normal limitations of treating existing compounds with a reactive atmosphere or other agent. Processes such as RAP have limitations because they can only approach the purity asymptotically, and have limited thermodynamic potential.

In the process of the present invention, the desired metal ion is selectively extracted because of thermodynamic partitioning between the desired metal cation and the contaminating cations. A reactive transport agent, such as chlorine, bromine, or iodine, is reacted with the desired metal and generates a gaseous metal-containing compound. The gaseous metal-containing compound containing the highly purified metal cation is then isolated from the starting materials, which include the excess unreacted metal and any contaminants. The gaseous metal-containing compound is then reacted with a fluorinating agent to form the desired solid metal flouride in a step that further enhances the purification of the metal fluoride compound. A flourinating agent is any compound capable of reacting with the gaseous metal-containing compound to form the desired metal fluoride. Examples of fluorinating agents include such compounds as fluorine gas, sulfur hexafluoride, hydrogen fluoride, and nitrogen trifluoride.

The process of the present invention involves the use of a continuous sequential reaction using direct reaction of a metal with the reactive transport agent to form a gaseous metal-containing compound. This reaction is followed by fluorination of the metal cation contained in the vapor, after the gaseous metal-containing compound has been isolated from the starting materials, to form the solid metal fluoride.

The reactions for zirconium and aluminum with a chlorine reactive transport agent are presented below:

$$Zr(s)+2Cl_2(g)\rightarrow ZrCl_4(g) \quad (1a)$$

$$ZrCl_4(g)+4/xRF_x(g)\rightarrow ZrF_4(s)+4/xRCl_x(g) \quad (1b)$$

$$Al(s)+3/2Cl_2(g)\rightarrow AlCl_3(g) \quad (2a)$$

$$AlCl_3(g)+3/xRF_x(g)\rightarrow AlF_3(s)+3/x\ RCl_x(g) \quad (2b)$$

In the above equations, $RF_x$ represents the fluorinating agent wherein R is a convenient cation, such as C, S, N or H, that forms a vapor easily with the anion of the reactive transport agent and does not interfere with other aspects of the reaction, and x represents the number of fluoride ions necessary to balance the charge of the cation. Fluorine gas ($F_2$) may also be used as the fluorinating agent.

Zirconium and aluminum are two of the most suitable candidates for the process, since they are of current interest in preparing fluoride glasses for optical fibers. Hafnium may be substituted for zirconium in equation (1) above, and gallium or indium appear to allow similar reactions to equation (2). Such substitutions in the glass provide a longer wavelength cutoff by replacing a lighter cation with a heavier one, decreasing the fundamental vibrational frequency, thus moving the infrared cutoff to longer wavelengths, which is desirable. Examples of other metals that can be used in the present method include titanium, zinc, cadmium, and mercury.

The chemical vapor purification process of the present invention offers the advantages of not requiring high temperatures to carry out the process and of using and producing reactants and products which are chemically compatible with available materials. For example, with a chlorine reactive transport agent, chlorine readily reacts with aluminum and zirconium to form volatile chlorides of the metals. Carbon, in the form of graphite or vitreous carbon, does not react with chlorine, bromine, or iodine; nor is carbon likely to react with the metals at the temperature involved.

In reactions (1a) and (2a) above, a chlorination reaction is the first step in the overall process. As stated previously, bromine and iodine are other potential active agents suitable for use in the first step since they both form volatile species with the cations of interest.

The purification capability of the process is based on the existence of near equilibrium conditions in the reaction of the first step and the presence of a stoichiometric excess of the desired metal. The presence of the excess metal avoids reaction and transport of undesirable species. The excess metal condition is easily achieved since a small amount of the reactive transport agent is metered into a vessel that contains an indefinitely large quantity of the metal to be transported. The purification potential was tested in calculation by establishing reaction conditions with one mole of the desired metal; adding either 0.01 or 0.0001 mole of metallic iron as a contaminant; and an excess of the desired metal (20 mole % excess in the following example). Iron was chosen as a contaminant for this calculation because it is one of the critical contaminants that must be controlled. Temperatures of 400 to 600 K were examined for aluminum, and 650 to 900 K for zirconium.

Table I lists the species which result from the chlorination of a zirconium sample which contains an iron metal contaminant. It is important to note that the unreacted iron is present with the unreacted zirconium metal, and that the value of the mole fraction for iron present is $8.3\times10^{-5}$. The only vapor species present in a mole fraction $\geqq 10^{-16}$ that contains iron is $FeCl_2$, at an estimated partial pressure of $2.6\times10^{-12}$ atm at 900 K.

TABLE I

Thermodynamic Calculations for the Chlorination of Zirconium

| | Mole Fraction Temperature (kelvin) | | | | | |
|---|---|---|---|---|---|---|
| Products | 900 | 850 | 800 | 750 | 700 | 650 |
| Cl | $4.8\times10^{-16}$ | $3.3\times10^{-17}$ | $1.6\times10^{-18}$ | $5.3\times10^{-20}$ | $1.1\times10^{-21}$ | $1.2\times10^{-23}$ |
| Fe(s) | $8.3\times10^{-5}$ | $8.3\times10^{-5}$ | $8.3\times10^{-5}$ | $8.3\times10^{-5}$ | $8.3\times10^{-5}$ | $8.3\times10^{-5}$ |
| $FeCl_2$ | $2.2\times10^{-12}$ | $2.3\times10^{-13}$ | $1.8\times10^{-14}$ | $9.9\times10^{-16}$ | $3.5\times10^{-17}$ | $7.6\times10^{-19}$ |
| Zr(s) | $1.6\times10^{-1}$ | $1.6\times10^{-1}$ | $1.6\times10^{-1}$ | $1.6\times10^{-1}$ | $1.6\times10^{-1}$ | $1.6\times10^{-1}$ |
| $ZrCl_2$ | $1.0\times10^{-10}$ | $1.5\times10^{-11}$ | $1.7\times10^{-12}$ | $1.4\times10^{-13}$ | $8.5\times10^{-15}$ | $3.2\times10^{-16}$ |
| $ZrCl_3$ | $2.3\times10^{-6}$ | $7.4\times10^{-7}$ | $2.0\times10^{-7}$ | $4.8\times10^{-8}$ | $9.0\times10^{-9}$ | $1.3\times10^{-9}$ |
| $ZrCl_4$ | $8.4\times10^{-1}$ | $8.4\times10^{-1}$ | $8.4\times10^{-1}$ | $8.4\times10^{-1}$ | $8.4\times10^{-1}$ | $8.0\times10^{-1}$ |

| Input conditions | Species | Moles |
|---|---|---|
| | Fe | 0.0001 |
| | Zr | 1.20 |
| | $Cl_2$ | 2.0 |

Products with less than $1.0\times10^{-16}$ mole fraction: $Cl_2$, Fe(l & g), FeCl, $FeCl_2$, $FeCl_2$(s & l), $FeCl_3$(s,l & g), $Fe_2Cl_4$, Zr(l & g), ZrCl, $ZrCl_2$(s & l), $ZrCl_3$(s & l)

As can be seen from Table I, essentially no iron species are present as gaseous compounds that can be transported under the conditions chosen, especially at lower temperatures. Effectively all the chlorine has been used to transport the zirconium as $ZrCl_4$, using 5/6 of the zirconium metal starting material. Less than $10^{-12}$ of the iron present in this example is transported, even at the highest temperature, although the vapor pressure of $FeCl_2$ is constant over the range of impurity iron considered. There also exists a possibility that a compound will form from all three elements present in the reaction for which no thermodynamic data exists that has a high enough vapor pressure to be transported. In addition, equilibrium conditions do not exist except in thermodynamic calculations, and some transport can certainly be anticipated in any real reaction. By a choice of conditions of temperature and transport rate, such carry-over can be minimized.

Additional calculations have shown that essentially identical results hold down to 0.00001 mole % excess metal.

The kinetics of the reaction, especially the formation of the volatile metal chloride, may be rate controlling at the lower temperatures, establishing a practical minimum temperature. Past experience has shown this to not be a problem in the aluminum reaction at temperatures 475 K, i.e., the reaction goes to completion.

Table II shows the result of including all of the problem transition metal contaminants and water vapor in the initial aluminum charge that is reacted. Lanthanides were not included because of the paucity of reliable data, and the general knowledge that their metals and chlorides have very low vapor pressure.

TABLE II

Chlorination of Aluminum with Contaminants

| | Mole Fraction Temperature (kelvin) | | |
|---|---|---|---|
| Products | 600 | 550 | 500 |

TABLE II-continued

| Chlorination of Aluminum with Contaminants | | | |
|---|---|---|---|
| Al(s) | $2.8 \times 10^{-1}$ | $2.8 \times 10^{-1}$ | $2.9 \times 10^{-1}$ |
| AlCl | $1.7 \times 10^{-8}$ | $8.7 \times 10^{-1}$ | $2.5 \times 10^{-11}$ |
| $AlCl_2$ | $7.9 \times 10^{-8}$ | $5.3 \times 10^{-9}$ | $2.0 \times 10^{-10}$ |
| $AlCl_3$ | $1.8 \times 10^{-2}$ | $6.0 \times 10^{-3}$ | $1.6 \times 10^{-3}$ |
| $Al_2Cl_6$ | $7.0 \times 10^{-1}$ | $7.1 \times 10^{-1}$ | $71 \times 10^{-1}$ |
| $Al_2O_3$(s) | $4.7 \times 10^{-5}$ | $4.7 \times 10^{-5}$ | $4.8 \times 10^{-5}$ |
| Co(s) | $1.4 \times 10^{-4}$ | $1.4 \times 10^{-4}$ | $1.4 \times 10^{-4}$ |
| Cu(s) | $1.4 \times 10^{-4}$ | $1.4 \times 10^{-4}$ | $1.4 \times 10^{-4}$ |
| Fe(s) | $1.4 \times 10^{-4}$ | $1.4 \times 10^{-4}$ | $1.4 \times 10^{-4}$ |
| HCl | $7.9 \times 10^{-11}$ | $8.5 \times 10^{-12}$ | $5.8 \times 10^{-13}$ |
| $H_2$ | $1.4 \times 10^{-4}$ | $1.4 \times 10^{-4}$ | $1.4 \times 10^{-4}$ |

| Content of Metal Starting Material | Species | Moles |
|---|---|---|
| | Al | 1.2 |
| | Co | 0.0001 |
| | Cu | 0.0001 |
| | Fe | 0.0001 |
| | $H_2O$ | 0.0001 |
| | $Cl_2$ | 1.5 |

Table II again suggests that the transition metal contaminants are unlikely to present a problem. The presence of hydrogen at a vapor pressure of $\approx 10^{-4}$ causes less certainty in establishing a low OH content in the final fluoride product, but an excess of the fluorinating agent is expected to provide the necessary control. The products that were considered but found to be less than $10^{-16}$ mole fraction were not listed because of the very extensive list of 78 combinations, but important ones such as $FeCl_2$, $CuCl_2$, $CoCl_2$, OH and $H_2O$ were included on that list.

Similar calculations were performed for a variety of conditions for the fluorination reactions of equations (1b) and (2b). A variety of fluorinating agents were examined, including $CF_4$, $F_2$, $SF_6$, $SF_4$, and HF. All were found to be thermodynamically feasible. For instance, one of the fluorinating agents, $SF_6$, although a very stable compound, has been shown experimentally to react with $ZrCl_4$. However, carbon tetrafluoride ($CF_4$) has not been shown to react to any useful degree. All of the reactions examined did proceed as desired in useable temperature ranges. Water vapor was also included in some of the calculations, and a low vapor pressure was indicated. Fluorine ($F_2$) can also be used as a fluorinating agent in the present invention.

The experimental configuration selected for use in carrying out the present invention is a temperature zone tube reactor. A reactor having temperature capabilities up to 800° C. is suitable for carrying out the method of the present invention. This permits the use of conventional tube furnaces.

Minimum and maximum temperatures for use with various metals in the method of the present invention are set forth below in Table III.

TABLE III

| Metal | Temperature (°C.) Minimum | Maximum |
|---|---|---|
| Zr | 330 | 900 |
| Hf | 320 | 1,000 |
| Al | 180 | 1,200 |
| Ga | 200 | 1,000 |
| In | 600 | 1,200 |

The minimum temperature is the temperature at which a particular metal chloride sublimes at one atmosphere. The maximum temperature is the sublimation temperature for a particular metal fluoride.

A particularly inert and/or pure liner is used in the reactor in order to avoid recontaminating the purified fluoride product, and to prevent attack of the liner by the fluorides. An example of a suitable liner material is vitreous carbon coated graphite since its inertness is well recognized in the presence of fluorides and the absence of oxygen and water vapor. Preferably the reactor is protected from attack by atmospheric oxygen by using a shielding tube outside of the reaction tube, with an inert gas passing in the annulus.

The schematic configuration of the reactor is shown in FIGURE. A predetermined quantity of the reactive transport agent is carried from a source of reactive transport agent (not shown) to a first reactor 30 by a first line 11. The first reactor contains a sample of the metal to be converted into a metal fluoride. Strips of reasonably pure metal, preferably in the form of a metal foil, are placed in the first reactor 30 in a manner such that the flow must pass over a substantial surface area of material. In this manner, the very important excess metal condition is maintained to minimize the transport of contaminants. For example, the metal sample can be suspended from the upper surface of the first reactor. In the case of aluminum and a chlorine reactive transport agent, the first reactor, i.e., the first reaction zone, should be maintained at a temperature greater than or equal to 475 K (200° C.) in order to avoid condensation of dimeric aluminum chloride.

A second carrier line 31 transports the gaseous metal-containing compound to the second reactor 50. The second carrier line 31 must also be heated to a temperature sufficiently high to avoid condensation of the gaseous metal-containing compound.

The metal-containing vapor is then reacted in the second reactor with a suitable fluorinating agent. The fluorinating agent is introduced into the second reactor 50 via a third carrier line 41. A buffer gas can optionally be used to prevent the flow of the fluorinating agent out of the second reactor and into the second carrier line 31 or the first reactor 30. The use of the buffer gas avoids premature reaction of the fluorinating agent with the gaseous-metal-containing compound. The buffer gas can be any gas, which is inert to reaction with the other reactants e.g., argon. The resulting metal fluoride powder falls into container 60. Because there is a concern that the metal fluoride powder could be recontaminated from both the reaction atmosphere and subsequent handling, the used gaseous reactants are vented by an exhaust 70 for disposal.

EXAMPLE

An amount of $ZrF_4$ in excess of 100 grams was prepared during a two hour period using the chemical vapor purification process of the present invention. Chlorine was used as the reactive transport agent and hydrogen fluoride was used as the fluorinating agent. This specific run was performed using half the flow of reactive transport agent that the equipment is capable of providing, and half the flow of fluorinating agent required for stoichiometry. The $ZrF_4$ was largely collected in the appropriate container, and a powder was found on the cooler base of the reactor. Qualitative examinations suggested that the latter material was basically $ZrCl_4$.

Spark source mass spectroscopy (SSMS) analyses of both the starting metal and two independent analyses of the product are reported in Table IV. The absence of deleterious rare earth metals in the fluoride is significant as trace quantities were found in the starting metals.

TABLE IV

| | Analyses of $ZrF_4$ and Zr Metal | | |
|---|---|---|---|
| | | Parts per Million (Weight) | |
| Element | GTEL Mat. Eval. Zr metal | GTEL Mat.Eval. $ZrF_4$ | Northern Analytical $ZrF_4$ |
| Fe | 2100 | 2.1 | 0.5 |
| Ni | 41 | 1.2 | ≦0.03 |
| Mn | 46 | 1.7 | 0.5 |
| Cr | 140 | 0.4 | 0.3 |
| V | 5 | 0.7 | 0.04 |
| Co | 3 | 6.0 | nd |
| Cu | 31 | 0.4 | 0.04 |
| Hf | 72 | 9.0 | 25.0 |
| Zn | 1 | nd | ≦0.04 |
| Sn | 16 | nd | nd |
| Ce | 0.5 | nd | nd |
| Nd | 0.8 | nd | nd |
| Pr | 0.3 | nd | nd |
| Sm | 0.5 | nd | nd |

While there has been shown and described what are at present considered the preferred embodiments of the invention, it will be obvious to those skilled in the art that various changes and modifications can be made therein without departing from the scope of the invention as defined by the appended claims.

What is claimed is:

1. A chemical vapor purification process for preparing metal fluorides comprising:

reacting at near-equilibrium conditions a metal selected from the group consisting of metals forming fluorides suitable for use in fluoride glass and thermodynamically partitionable from Fe, Cu, Co, OH and $H_2O$ selected contaminants with a reactive transport agent selected from the group consisting of chlorine, bromine, and iodine [anions] in the presence of a stoichiometric excess of the metal to a generate gaseous, metal-containing compound;

isolating the gaseous, metal-containing compound from the starting materials; and reacting the isolated gaseous, metal-containing oampound with a gaseous fluorinating agent to form a solid metal fluoride.

2. A method in accordance with claim 1 wherein the fluorinating agent is selected from the group consisting of fluorine gas, sulfur hexafluoride, sulfur tetrafluoride, hydrogen fluoride and nitrogen trifluoride.

3. A process in accordance with claim 1 wherein the metal is selected from the group consisting of zirconium, and hafnium.

4. A process in accordance with claim 1 wherein the metal is selected from the group consisting of aluminum, gallium, and indium.

5. A process in accordance with claim 1 wherein the metal is selected from the group consisting of zinc and cadmium.

6. A chemical vapor purification process for preparing aluminum fluoride comprising:

reacting at near-equilibrium conditions aluminum metal with a reactive chlorine transport agent in the presence of a stoichiometric excess of aluminum to generate a gaseous aluminum chloride compound;

isolating the gaseous aluminum chloride compound from the unreacted aluminum; and reacting the isolated gaseous aluminum chloride with a gaseous fluorinating agent selected from the group consisting of $F_2$, $SF_6$, $SF_4$, HF, and $NF_3$ to form a solid aluminum fluoride.

7. A chemical vapor purification process for preparing zirconium fluoride comprising:

reacting at near-equilibrium condition zirconium metal with a reactive chlorine transport agent in the presence of a stoichiometric excess of zirconium to generate a gaseous zirconium chloride compound;

isolating the gaseous zirconium chloride compound from the unreacted zirconium; and reacting the gaseous zirconium chloride with gaseous hydrogen fluoride to form a solid zirconium fluoride.

* * * * *